United States Patent
Keane et al.

(10) Patent No.: US 9,187,809 B2
(45) Date of Patent: Nov. 17, 2015

(54) TOUGH COATED HARD PARTICLES CONSOLIDATED IN A TOUGH MATRIX MATERIAL

(75) Inventors: John M. Keane, Harrison City, PA (US); Randall M. German, Del Mar, CA (US)

(73) Assignee: Allomet Corporation, N. Huntingdon, PA (US)

( * ) Notice: Subject to any disclaimer, the term of this patent is extended or adjusted under 35 U.S.C. 154(b) by 389 days.

(21) Appl. No.: 12/849,711

(22) Filed: Aug. 3, 2010

(65) Prior Publication Data

US 2011/0030440 A1 Feb. 10, 2011

Related U.S. Application Data

(60) Provisional application No. 61/231,149, filed on Aug. 4, 2009.

(51) Int. Cl.
| | |
|---|---|
| *C22C 29/00* | (2006.01) |
| *C22C 29/02* | (2006.01) |
| *B22F 1/02* | (2006.01) |
| *C04B 35/117* | (2006.01) |
| *C04B 35/58* | (2006.01) |
| *C04B 35/628* | (2006.01) |
| *C04B 35/645* | (2006.01) |
| *C22C 26/00* | (2006.01) |

(52) U.S. Cl.
CPC . *C22C 29/02* (2013.01); *B22F 1/02* (2013.01); *B22F 1/025* (2013.01); *C04B 35/117* (2013.01); *C04B 35/58021* (2013.01); *C04B 35/62831* (2013.01); *C04B 35/645* (2013.01); *C22C 26/00* (2013.01); *C04B 2235/3217* (2013.01); *C04B 2235/3847* (2013.01); *C04B 2235/3856* (2013.01); *C04B 2235/3886* (2013.01); *C04B 2235/96* (2013.01); *Y10T 428/12014* (2015.01)

(58) Field of Classification Search
USPC .................. 75/232, 235–236, 238–240, 242
See application file for complete search history.

(56) References Cited

U.S. PATENT DOCUMENTS

| | | | |
|---|---|---|---|
| 3,752,655 A | 8/1973 | Ramqvist et al. | |
| 3,871,840 A | 3/1975 | Wilder et al. | |
| 7,736,582 B2 * | 6/2010 | Toth | 264/642 |
| 2005/0230150 A1 * | 10/2005 | Oldham et al. | 175/57 |

FOREIGN PATENT DOCUMENTS

| | | |
|---|---|---|
| DE | 1227374 | 10/1966 |
| EP | 0493351 | 7/1992 |
| WO | WO 2006-001791 | 1/2006 |

OTHER PUBLICATIONS

International Search Report from PCT/US2010-044241 dated Nov. 11, 2010.
Toth et al., Tough-Coated Hard Powders for HardMetals of Novel Properties, Proceedings of the International Plansee Seminar, vol. 2, pp. 306-325 (Jan. 1, 2001).
ROC (Taiwan) Search Report of Corresponding Application No. 099125853 dated Sep. 10, 2014 (7 pages).

* cited by examiner

*Primary Examiner* — George Wyszomierski
*Assistant Examiner* — Ngoclan T Mai
(74) *Attorney, Agent, or Firm* — Finnegan, Henderson, Farabow, Garrett & Dunner, LLP

(57) ABSTRACT

Consolidated materials comprising a plurality of coated particles dispersed in a tough matrix material are disclosed. The coated particles include a plurality of core particles having an intermediate layer that substantially surrounds each of the core particles. An optional outer layer may be present on the intermediate layer. A matrix contains or substantially contains each of the coated particles, and is formed from at least one third compound including a mixture of W, WC, and/or $W_2C$ with Co. The amount of Co in the at least one third compound may range from greater than 0 to about 20 weight %. Methods for providing consolidated materials, and articles comprising such consolidated materials are also disclosed.

23 Claims, 8 Drawing Sheets

TOUGH COATED HARD PARTICLES CONSOLIDATED IN A TOUGH MATRIX MATERIAL

This application claims the priority benefit of U.S. Patent Application No. 61/231,149, filed Aug. 4, 2009, the contents of which are hereby incorporated by reference.

FIELD OF THE INVENTION

The present disclosure relates to consolidated materials that include coated particles dispersed in a tough matrix. The present disclosure also relates to methods for manufacturing such materials, and articles including such materials.

BACKGROUND OF THE INVENTION

Tough coated hard particles ("TCHP" or EternAloy®) are a novel family of particulate materials. Conventionally, TCHP comprise at least one type of superhard, Geldart Class C or larger ceramic and/or refractory alloy core particles having extreme wear resistance, lubricity, and other properties which are individually coated with thin (e.g., nm) layers of a metal compound having a relatively high fracture toughness, such as WC or TaC. In conventional TCHP, an outer coating of a metal, such as Fe, Co or Ni, is provided around the individual particles. The combination of multiproperty alloys within the TCHP structure allows the combination of normally conflicting performance extremes, including, but not limited to toughness, abrasive wear resistance, chemical wear resistance, and light weight, at levels previously not attained from materials formed from sintered homogenous powders. TCHP materials are described in U.S. Pat. No. 6,372,346 to Toth, which is incorporated herein by reference. Methods for consolidating TCHP materials are described in U.S. Pre-Grant Publication No. 2005/0275143, which is also incorporated herein by reference.

The strength of a crystalline substance depends on atomic bonding and dislocation structure. Dislocations are linear atomic lattice defects that may be mobile, or may be pinned and immobile. Normally they are pinned and immobile. In a mixture of two atomically bonded crystalline materials that are combined to form a composite structure, there are upper and lower bound estimates to the elastic modulus of the composite as calculated by the rule of mixtures and the inverse rule of mixtures. Subjected to increasing load, the material deforms elastically until the dislocations in the grains begin to flow or slip, leading to the onset of permanent yielding and limiting useful strength. At particle sizes of approximately one micrometer and below, exceptionally high strengths can develop in such materials, due mainly to image dislocation stresses.

Typically there is a cylindrical strain field around each dislocation that extends outward into the surrounding lattice. Theoretically, this strain field around each dislocation must be balanced by opposing strain fields, otherwise the dislocation will move away from surfaces. When the crystal size is large compared to its strain field, no image stress is created around a dislocation unless it is at the crystal surface. In a sintered material wherein a plurality of crystalline particles are joined by a matrix material, the image stress matches the lower strength of the matrix, but for large crystals this is a trivial correction since most dislocations are not near a surface.

In submicron polycrystalline particles, the strain field may extend into neighboring grains, whose atomic lattice is most likely not aligned with that of the strain field of any neighboring grain. This balancing strain field outside the grain surface restrains movement of the dislocation, thus restraining yielding and increasing strength. As the size of the grains diminishes further, more dislocations are near surfaces and the strength further increases.

In conventional sintered TCHP, which include a core particle coated with an intermediate layer and, optionally, an outer layer of Fe, Ni, Co, or combinations thereof, the thickness of the intermediate layer is relatively thin. Although not precisely understood, it is believed that when the intermediate layer and the optional outer layer (if any) connecting the coated particles in conventional sintered TCHP are thin enough, the strain field actually passes through the outer layer material and into neighboring particles. This can result in the creation of high strength that is not controlled by the material between the TCHP particles (if any). In other words, the mechanical properties of conventional sintered TCHP can be independent of the properties of the outer layer phase, assuming it is crystalline and very thin.

While the transfer of strain fields in conventional sintered TCHP may result in certain improved properties, e.g., strength, it may adversely impact the toughness of the articles formed from such materials. As a result, articles formed from conventional sintered TCHP can exhibit very high strength, but may exhibit insufficient fracture toughness for some applications.

Thus, a need exists in the art for consolidated materials and articles that exhibit improved fracture toughness, relative to conventional sintered TCHP, while maintaining or substantially maintaining the hardness and/or other beneficial properties exhibited by conventional sintered TCHP. The consolidated materials and processes of the present disclosure achieve this goal, e.g., by dispersing TCHP in a tough matrix phase material, and/or by controlling the microstructure of the consolidated article so as to limit the transfer of strain fields between adjacent TCHP particles.

SUMMARY OF THE PRESENT DISCLOSURE

Disclosed herein are consolidated materials that include coated particles dispersed in a matrix. In one non-limiting embodiment, the coated particles include a core material. At least one intermediate layer is disposed on the core material. The at least one intermediate layer includes a material that is different from the core material, and which has a higher fracture toughness than the core material. An optional outer layer, e.g., comprising at least one of Fe, Co, and Ni, may be present on the at least one intermediate layer. The matrix of the consolidated material includes a mixture of first particles including W and/or WC with second particles comprising Co or, alternatively or in addition to the mixture of first and second particles, the matrix includes an alloy of Co with W and/or WC. The amount of Co in the matrix may range from greater than 0 to about 20 weight % or more.

Also disclosed herein are sintered materials that include coated particles in a matrix. In one non-limiting embodiment, the coated particles include a plurality of core particles that include at least one core material chosen from cubic boron nitride and diamond. At least one intermediate layer is disposed around substantially each of the plurality of core particles. The at least one intermediate layer includes at least one second compound different in composition from the at least one first compound, and which has a fracture toughness higher than the first compound. An optional outer layer comprising at least one of Fe, Co, and Ni may be present on the at least one intermediate layer. The matrix of the sintered material contains or substantially contains each or substantially each of the coated particles, and includes at least one third compound. The at least one third compound may include a mixture of first particles of tungsten and/or tungsten carbide with second particles of Co. Alternatively, or in addition to the mixture of first and second particles, the at least one third compound may comprise an alloy of tungsten and/or tungsten carbide with Co. Co may be present in the third compound in an amount ranging from greater than 0 to about 20 weight %, or more.

The present disclosure also describes methods for providing consolidated articles. In one non-limiting embodiment, the present disclosure describes a method for providing a consolidated article comprising a plurality of coated particles in a matrix. In this non-limiting embodiment, a plurality of core particles including a core material are provided. At least one intermediate layer is provided on substantially each of the plurality of core particles to form coated particles. The at least one intermediate layer includes a material different from the core material and which has a higher fracture toughness than the core material. An optional outer layer comprising at least one of Fe, Co, and Ni may be present on the at least one intermediate layer.

The coated particles are mixed with particles of a matrix to form a mixed powder. The matrix, which includes greater than 0 to about 20 weight % of Co or more, may include a mixture of first particles of tungsten and/or tungsten carbide with second particles of Co. Alternatively, or in addition to the mixture of first and second particles, the matrix may include an alloy of tungsten and/or tungsten carbide with Co. The mixed powder is shaped into an article, and then consolidated such that the matrix contains or substantially contains each or substantially each of the coated particles.

In some embodiments, the consolidated articles of the present disclosure exhibit higher toughness than an article formed from conventional sintered TCHP that does not comprise a tough matrix. For example, the materials of the present disclosure can exhibit improved transverse rupture strength relative to conventional sintered TCHP, while substantially maintaining or improving the Vickers hardness or other desired properties of conventional sintered TCHP materials. In addition, the inclusion of materials other than TCHP particles such as W, WC, $W_2C$, and Co can provide a significant cost savings, thereby allowing the provision of a hard material with greater strength than conventional TCHP materials, but at reduced cost.

The consolidated articles of the present disclosure may also exhibit anisotropic properties. For example, when the articles disclosed herein are consolidated via a process that includes pressing with a specific directionality, such as uniaxial hot pressing, the mechanical properties of the consolidated article in a direction parallel to the pressing direction may differ from the mechanical properties of the article in a direction perpendicular to the pressing direction. In some embodiments, the consolidated articles of the present disclosure are produced via uniaxial hot pressing, and exhibit a greater transverse rupture strength along a direction perpendicular to the pressing direction than the transverse rupture strength along a direction parallel to the pressing direction.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not intended to limit the appended claims.

The accompanying drawings, which are incorporated in and constitute a part of this specification, illustrate several non-limiting embodiments of the present disclosure and together with the description, serve to explain the principles of the present disclosure.

DETAILED DESCRIPTION

Figure 1:
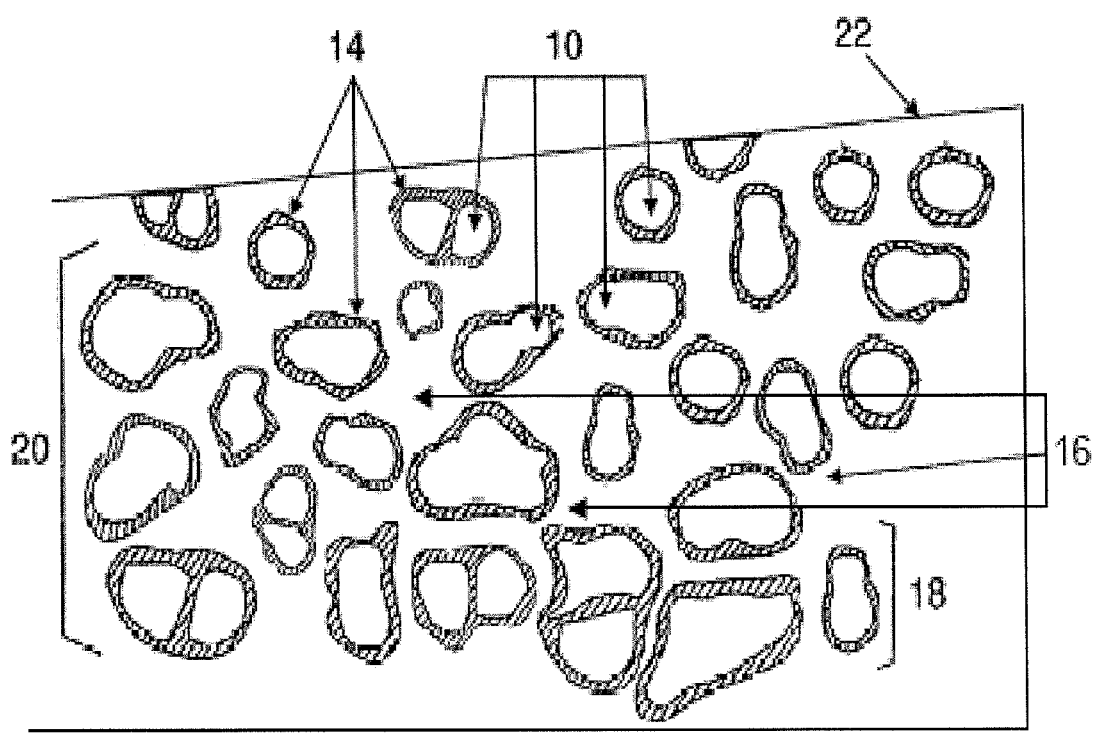
FIG. 1 is a schematic cross-sectional view of one embodiment of the consolidated materials of the present disclosure.

One aspect of the present disclosure relates to consolidated materials composed of tough coated hard particles ("TCHP") dispersed in a tough matrix material.

As used herein, the term "consolidated material" means a material that has been subject to a shaping and/or compression process, optionally in combination with a thermal treatment process for creating a solid or substantially solid article. In some embodiments of the present disclosure, the optional thermal treatment process includes, e.g., sintering and/or cladding. The optional thermal treatment process may be performed in conjunction with the compression process, or subsequent to the compression process.

In some embodiments, a consolidated material is produced by a multi-step process. For example, the components of the material may be first shaped by a process such as compaction, tape casting, slurry casting, or other similar process, and then thermally processed (e.g., by sintering and/or cladding) to form a solid or substantially solid article. In some embodiments, the shaping and thermal treatment processes are performed at substantially the same time, e.g., via hot isostatic pressing, hot pressing, electron beam rapid prototyping, extrusion and/or rolling.

TCHP particles suitable for use in the present disclosure may be provided, for example, in the form of a powder that includes a plurality of core particles that are individually coated with at least one intermediate layer. An optional outer layer, e.g., comprising at least one of Fe, Co, and Ni, may be present on the at least one intermediate layer. The core particles and layer materials are intended to impart their physical properties to the overall TCHP particle.

In some embodiments, the core particles include at least one first compound chosen from metal materials of the formula $M_aX_b$, where M represents at least one of titanium, zirconium, hafnium, vanadium, niobium, tantalum, chromium, molybdenum, tungsten, aluminum, magnesium, and silicon, X represents at least one of nitrogen, carbon, boron, oxygen, and sulfur, and a and b are numbers greater than zero up to and including fourteen. In addition to such metallic materials, the at least one first compound may be chosen from non-metallic materials such as cubic boron nitride (cBN), hexagonal boron nitride (hBN), and diamond. As used herein, the term "compound" is not limited to a material formed of two elements, and thus can also refer to the diamond form of carbon.

One of ordinary skill in the art will understand that in crystalline materials, individual atoms in a unit cell may be shared with adjacent unit cells. Accordingly, in the formula $M_aX_b$, subscripts "a" and "b" may be chosen from whole numbers or non-whole numbers ranging from greater than 0 to 14. In some embodiments, subscripts "a" and "b" are chosen from whole numbers ranging from greater than 0 to 14.

In some embodiments of the present disclosure, the core particles may include at least one core material chosen from diamond, cubic boron nitride, and/or at least one first compound including at least one primary element compounded with at least one secondary element. The at least one primary element is chosen from titanium, zirconium, hafnium, vanadium, niobium, tantalum, chromium, molybdenum, tungsten, aluminum, magnesium, and silicon, and the at least one secondary element is chosen from nitrogen, carbon, boron, sulfur and oxygen.

In general, the core particle materials (first compound) are hard (i.e., they exhibit relatively high Vickers hardness) and can exhibit certain other useful properties, such as wear resistance and chemical resistance to most environments and work pieces. However, these materials often have limited fracture toughness (the ability to arrest a propagating crack).

Of course, other metallic and nonmetallic compounds may also be used as core particles in accordance with the present disclosure. For example, in some embodiments of the present disclosure the at least one first compound consists essentially of at least one stoichiometric compound. Further, the individual core particles of the TCHP powder may, for example, be formed from different first compound materials. Similarly, the individual core particles may be formed from a mixture of first compound materials. In any case, the general purpose is to impart the properties of the various core particle materials to the articles formed therefrom.

As examples of first compound materials which may be suitably used for the core of the TCHP disclosed herein, non limiting mention is made of $AlB_2$, $Al_4C_3$, $AlN$, $Al_2O_3$, $AlMgB_{14}$, $B_4C$, cubic boron nitride (cBN), hexagonal boron nitride (hBN), $CrB_2$, $Cr_3C_2$, $Cr_2O_3$, diamond, $HfB_2$, $HfC$, $HfN$, $Hf(C,N)$, $MoB_2$, $Mo_2B_5$, $Mo_2C$, $MoS_2$, $MoSi_2$, $NbB_2$, $NbC$, $NbN$, $Nb(C,N)$, $SiB_4$, $SiB_6$, $SiC$, $Si_3N_4$, $SiAlCB$, $TaB_2$, $TaC$, $TaN$, $Ta(C,N)$, $TiB_2$, $TiC$, $TiN$, $Ti(C,N)$, $VB_2$, $VC$, $VN$, $V(C,N)$, $WB$, $WB_2$, $W_2B_5$, $WC$, $W_2C$, $WS_2$, $ZrB_2$, $ZrC$, $ZrN$, $Zr(C,N)$, $ZrO_2$, and mixtures and alloys thereof. In particular, non-limiting mention is made of first compounds consisting essentially of diamond, cubic boron nitride, $Al_2O_3$, $B_4C$, $HfB_2$, $MoS_2$, $SiC$, $Si_3N_4$, $TiC$, $Ti(C,N)$, $WS_2$, and mixtures and alloys thereof.

As used herein, "chosen from" or "selected from" refers to the selection of individual components or the combination of two (or more) components. For example, X in the formula $M_aX_b$ may comprise only one of nitrogen, carbon, boron, oxygen, and sulfur, or it may comprise a mixture of any or all of these components.

It is known that increased toughness normally results from decreasing grain size. In some embodiments of the present disclosure, the average size of the core particles ranges from about 0.1 µm to about 100 µm. For example, the average size of the core particles may range from about 100 nm to about 100 µm, such as from about 100 nm to about 2 µm, or even about 0.1 µm to about 1 µm. Of course, other core particle sizes may be used, and the core particle size may vary within the above-described ranges.

The at least one intermediate layer may be applied to all or a portion of the exterior surface of the core particles. In some embodiments of the present disclosure, the at least one intermediate layer is applied to the exterior surface of substantially each core particle. The at least one intermediate layer may be formed, for example, from at least one second compound different in composition from the at least one first compound of the core. In some embodiments, the at least one second compound is formed from a material having higher relative fracture toughness than the at least one first compound of the core. The at least one second compound may also be capable of bonding with the at least one first compound and/or a matrix material (described below).

In some embodiments of the present disclosure, the at least one second compound includes at least one of $B_4C$, W, WC, $W_2C$, SiC, $Si_3N_4$, $TiB_2$, $Ti(C,N)$, either alone or in combination with another element or material. For example, the at least one second compound may consist essentially of W, WC, and/or $W_2C$, optionally in combination with Co. In some embodiments, the at least one second compound consists essentially of W, WC, and/or $W_2C$, in combination with less than about 20 weight % Co, such as less than about 15 weight % Co, or even less than about 10 weight % Co. Of course, the at least one intermediate layer may contain more or less Co than described above. Further, the amount of Co in the at least one intermediate layer may vary incrementally within the aforementioned ranges.

As will be discussed below, the combination of a relatively tough and strong intermediate layer(s) and a hard core provide a powder and consolidated materials formed therefrom with exceptional mechanical properties. In some embodiments, the coated particles have an average particle size of less than about 100 µm, such as less than about 50 µm, including less than about 2 µm, or even less than about 1 µm.

The particle size of the coated particles and the volume of the at least one intermediate layer may also be controlled to suit any desired application. For example, the particle size and intermediate layer volume may be controlled to obtain targeted Co—WC ratios within the aforementioned ranges.

The selection of the compositions for the different portions of the particles can be based on publicly available information as to the known characteristics of candidate materials on the macro level. For example, it is known that diffusion wear (dissolution of a tool material into the material of a work piece) can be estimated for various materials by considering their standard free energy of formation at the operating temperature. Taken in order, WC, TiC, TiN, and $Al_2O_3$ have increasingly negative energies of formation. Therefore, TiN is seen to provide a significantly reduced diffusion wear in comparison with standard WC cutting tools.

Moreover, dissolution of the tool material into the material of the work piece can be a problem when the materials are in contact at relatively high temperatures. Thus, the rates of dissolution of various tool materials into iron (the typical work piece), at temperatures ranging from 1000-1100° C., are of commercial significance and differ strongly from one material to another. A comparison shows that a significant TiN presence on the tool surface will ensure a significant decrease of WC dissolution into iron. At 500° C., for example, the relative dissolution rates are:

WC: $5.4*10^4$
TiC: 1.0
TiN: $1.8*10^{-3}$
$Al_2O_3$: $8.9*10^{-11}$

This is believed to explain the improvements in wear behavior of WC tools against iron, e.g., when a WC coating is associated with a TiN core. Specifically, it is believed that an exposed TiN core will present a lower diffusion wear rate into iron than WC. A WC continuous particle coating is also believed to be desirable for the formation of a strong shell and the attainment of high mechanical properties (e.g., Young's modulus of 696 GPa, compared to 250 GPa for TiN). A TiN core (having a Vickers hardness of HV=2400 compared to a value of HV=2350 for WC, and having a sliding coefficient of friction $\mu=0.125$ compared to a value of $\mu=0.200$ for WC) will reduce friction wear against iron; the core will be exposed to the surface of the tool after its finish grinding and polishing.

It is also possible to have the core particles be a plurality of different metallic or nonmetallic compounds as long as each are compatible and different from the material comprising the intermediate layer on the core particles. The properties of an article comprised of the consolidated material, when the core particles are exposed by removing a portion of the intermediate layer, are determined principally by the properties of the core particle, their concentration in the consolidated material, and their combinations.

For example, if it is desired to form the consolidated material into a cutting insert, the material could be ground or shaped by EDM (electro discharge machining) to expose the core particles. In a non limiting embodiment of the present disclosure, where the core particles are TiN and the intermediate layer is WC, the coefficient of friction of the TiN, its hardness, and resistance to wear impart those properties to the cutting insert while the overall strength of the insert and its resistance to crack propagation are enhanced by the WC layer surrounding the TiN core particles. Significantly, wear of the insert will not result in the diminution of the characteristics of such an insert because the TiN is not a coating to be worn off. Rather, it is an integral part of the insert material that renews the surface as it is worn.

In some embodiments of the present disclosure, the core consists essentially of cBN and/or diamond. However, these embodiments may require the use of particles having a specific size and intermediate layers having a specific thickness to realize the potential of the cBN and/or diamond core particle. For example, the core particles may need to be integrated into the consolidated material vis-a-vis a load-bearing intermediate layer of another compound having a composition and thickness tailored to result in a consolidated material having useful engineering properties. In this regard, each of the core particles may be coated, for example, with at least one intermediate layer that consists essentially of W, WC, and/or $W_2C$, optionally in combination with Co. For example, the at least one intermediate layer may consist essentially of W, WC, and/or $W_2C$ in combination with 0 to about 20 weight % Co, such as from greater than 0 to about 15 weight % Co, e.g., from about 5 to about 12 weight % Co.

The TCHP particles may have any shape, e.g., blocky, square, rectangular, ellipsoidal, spherical, flake, whisker, platelet, or they may be irregular. In some embodiments of the present disclosure, the TCHP particles are substantially spherical. In still other embodiments of the present disclosure, the TCHP particles are irregularly shaped. For example, the shape of the TCHP particles may be selected to suit a particular application, e.g., wire drawing (substantially spherical) and metal cutting/shaping (irregular/jagged).

The individual TCHP particles in accordance with the present disclosure may also include an optional outer layer of a material surrounding or substantially surrounding the intermediate layer. This optional outer layer may include, for example, a metal such as Co, Fe, Ni, and mixtures, alloys, and intermetallic compounds thereof.

The consolidated materials described herein also include a matrix that surrounds or substantially surrounds each of the TCHP particles. The matrix is formed from at least one third compound, which in some embodiments has a relatively high fracture toughness relative to the core particles. For example, the matrix may comprise a mixture of first and second particles, wherein the first particles include at least one of tungsten and tungsten carbide (e.g., WC and/or $W_2C$) and the second particles include Co. Alternatively, or in addition to the mixture of first and second particles, the matrix may comprise an alloy of at least one or tungsten and tungsten carbide with Co. Regardless, the amount of Co in the at least one third compound may range, for example, from greater than 0 to about 20 weight % Co or more, such as from about 5 to about 20 weight %, from about 8 to about 15 weight %, or even about 10 to about 12 weight %. Of course, the amount of Co in the at least one third compound may be selected to suit a particular application, and may vary incrementally within the aforementioned ranges. Further, the total amount of Co in the at least one third compound may be higher than 20 weight %.

In some embodiments, the amount of Co in the at least one third compound (matrix) is greater than the amount of Co in the at least one second compound (intermediate layer). For example, the at least one second compound may comprise from greater than 0 to about 5 weight % of Co, and the at least one third compound may comprise from about 10 to about 15 weight % of Co. Similarly, any other amount of Co within the ranges previously described for the intermediate layer and binder may be used, provided that the matrix contains more Co than the intermediate layer. By virtue of the increased Co content, the at least one third compound (matrix) may exhibit higher toughness properties, relative to the at least one second compound (intermediate layer).

In some embodiments, the consolidated materials of the present disclosure comprise sintered TCHP particles with a core comprising at least one first compound described above. In these embodiments, at least one intermediate layer is present on substantially each core, and comprises or consists essentially of W, WC, and/or $W_2C$, optionally in combination with Co. Further, matrix of at least one third material of a matrix contains or substantially contains the TCHP particles, and comprises or consists essentially of a mixture of W, WC, and/or $W_2C$ with greater than 0 to about 20 weight % of Co. For example, the at least one second compound may consist essentially of a mixture of WC or $W_2C$ with 5-10 weight % of Co, and the at least one third compound may consist essentially of a mixture of WC and/or $W_2C$ with greater than 10 weight % of Co, e.g., from greater than 10 to about 20 weight % Co or even from about 15 to about 20 weight % Co.

Any grade of tungsten or tungsten carbide raw material may be used in the at least one third compound (matrix). For example, "reclaimed" grade and/or "virgin" grade tungsten carbide may be used in the at least one third compound. In some embodiments of the present disclosure, the at least one third compound includes virgin grade tungsten carbide.

Additives such as grain growth inhibitors may be added to at least one third compound forming the matrix. As examples of such grain growth inhibitors, non limiting mention is made of the carbides of vanadium (e.g., VC), niobium, tantalum, titanium, chromium (e.g., $Cr_2C_3$), and mixtures thereof. Of course, other grain growth inhibitors or additives known in the art may be added to the at least one third compound. The grain growth inhibitors may be added to the at least one third compound in an amount suited for a desired application. For example, the grain growth inhibitors may be present in the at least one third compound in an amount ranging from greater than 0 to about 2 weight %, such as from about 0.1 to about 2 weight %, about 0.2 to about 1 weight %, or even from about 0.2 to about 0.4 weight %. Of course, more or less grain growth inhibitor may be added, and the amounts may vary incrementally within the aforementioned ranges.

The at least one third compound may also include, for example, other carbides such as TiC, TaC, NbC, HfC and mixtures thereof. Such carbides may be added in any desired amount, e.g., from greater than 0 to about 12 weight % or more. In some embodiments, at least one "other" carbide is present in the third compound in an amount ranging from about 1 to about 12 weight %, such as from about 2 to about 8 weight %, or even from about 4 to about 6 weight %. Of course, the third compound may contain more or less of an "other" carbide, and the amount of "other" carbide may vary incrementally within the aforementioned ranges.

In some embodiments, the third compound comprises an alloy of WC with about 10-12 weight % Co, wherein the alloy includes about 0.2 to about 0.3 weight % VC, and about 0.4 to about 0.6 weight % $Cr_2C_3$.

In some embodiments, the matrix functions to join the TCHP when the component materials are subject to reasonable sintering conditions, thereby resulting in the formation of a dense sintered material. For example, when the TCHP are consolidated via sintering, the matrix may at least partially sinter bond (either with itself or a binder material) to contain or substantially contain each TCHP particle in the resulting consolidated article. Such sintering can result in a sintered material having a microstructure comprising a plurality of TCHP that are separated by interstitial spaces, wherein the interstitial spaces are filled or substantially filled with matrix and/or binder. In other non-limiting embodiments, wherein the consolidated material is produced via a process that includes cladding, the matrix may function to bind the TCHP particles to a substrate.

The consolidated articles disclosed herein may, for example, exhibit a microstructure as illustrated schematically in FIG. 1. As shown, coated particles (18) include hard core particles (10) that are coated with a tough intermediate layer(s) (14), such as tungsten and/or tungsten carbide, optionally in combination with cobalt. Optional outer layer(s) (not shown) may be present on the intermediate layer. A matrix (16) comprising a third compound, such as tungsten carbide in combination with greater than 0 to about 20 weight % cobalt, is provided in the interstitial spaces between coated particles (18). Coated particles (18) are consolidated into a semi-finished or finished article, a microsection of which is generally designated by numeral (20).

The microstructure of the consolidated article is a framework of strongly interbonded unitary material of intermediate layers (14) and optional outer layers (if any), each containing and supporting its own hard core particle (10). The coated particles (18) are also held with matrix (16), and are exposed in cross-section at the external surfaces (22) when used in abrasive or wear applications, such as finish grinding or polishing.

In some embodiments, the matrix in the consolidated material contains or substantially contains a majority of the TCHP in the material. The amount and distribution of the matrix in the consolidated material may be nonuniform, substantially uniform, and/or uniform. Further, the matrix may be continuous or substantially continuous around the TCHP.

In some embodiments, the matrix functions to increase the interparticle distance between adjacent TCHP in the consolidated materials. As used herein, the term "interparticle distance" refers to the distance between central portions of adjacent TCHP in a consolidated material. For example, the interparticle distance between spherical TCHP in a consolidated material according to the present disclosure correlates to the distance between the center of adjacent spherical TCHP particles in the material.

For the purpose of this disclosure, the interparticle distance between TCHP consolidated in the absence of an added matrix is referred to as the "base interparticle distance." In general, TCHP that are consolidated, e.g., via sintering and/or cladding to full or substantially full density in the absence of an added matrix exhibit a base interparticle distance that is approximately equal to the average particle size of the individual TCHP. For example, when spherical TCHP having a diameter of approximately 1 μm are sintered to full density in the absence of an added matrix, it is expected that the base interparticle distance between adjacent TCHP in the resulting article will be approximately 2 μm. Of course, other base interparticle distances are possible and may be used.

In contrast to conventional sintered TCHP, the consolidated materials of the present disclosure may exhibit an interparticle distance between individual TCHP that is as much as 20 times the base interparticle distance, or more. For example, the interparticle distance between adjacent TCHP particle may range from about 2 to about 15 times the base interparticle distance, such as from about 4 to about 15 times base interparticle distance, or even about 4 to about 8 times the base interparticle distance.

The interparticle distance between adjacent TCHP may be adjusted, for example, by controlling the amount of TCHP relative to the at least one third compound of the matrix. For example, the TCHP may be present in an amount ranging from about 0 to about 50 weight %, relative to the weight of the matrix. In some embodiments of the present disclosure, the amount of TCHP ranges from about 1 to about 25 weight %, for example, from about 5 to about 20 weight % or about 15 to about 20 weight %, relative to the weight of the matrix. Of course, higher or lower amounts of TCHP may be used, and the amount of TCHP can vary incrementally within the aforementioned ranges. In other terms, the ratio of TCHP to matrix (TCHP:matrix) may range from about 95:5 to about 5:95, or any other ratio therebetween, such as about 20:80 or about 50:50.

As described above, it is believed that because the thickness of the intermediate layer and the outer layer connecting coated particles in conventional sintered TCHP is thin, strain fields associated with each individual particle pass through the binder and into neighboring particles. While this transfer may result in certain improved properties, it can adversely impact the toughness of the articles formed from such materials.

In some embodiments, the consolidated materials of the present disclosure address the issue of strain field transfer by using a tough matrix (as described above) to separate individual TCHP. It is believed that the tough matrix and/or increased interparticle distance limits the transfer of strain fields between adjacent particles in a consolidated material, thereby improving toughness. Thus, use of a tough matrix, optionally in conjunction with increasing the interparticle distance, can allow the consolidated materials of the present disclosure to exhibit improved toughness properties, relative to conventional sintered TCHP.

The consolidated materials of the present disclosure may also exhibit a combination of properties not previously observed with traditional sintered TCHP. For example, the consolidated materials of the present disclosure may exhibit a combination of improved fracture toughness (e.g., assessed by the transverse rupture strength) relative to conventional sintered TCHP, while at the same time substantially maintaining the hardness (e.g., assessed by the Vickers hardness) of conventional sintered TCHP. As a result, the consolidated materials of the present disclosure may exhibit improved toughness characteristics relative to conventional sintered hard particles (e.g., conventional TCHP), while maintaining excellent hardness properties.

One of ordinary skill in the art will understand that to achieve desired properties, it will be necessary to select an appropriate combination of core material (first compound), intermediate layer (second compound), and matrix (third compound). Thus, a skilled artisan wishing to provide particles in accordance with the present disclosure that exhibit higher transverse rupture strength ("TRS") than conventional TCHP particles would exercise appropriate skill and understanding to select the necessary first, second, and third compounds.

Non-limiting examples of particular combinations of first (core), second (intermediate layer(s)), optional outer layer, and third (matrix) compounds are recited in Table 1 below.

TABLE 1

| Core Particle (First Compound) | Intermediate Layer (Second Compound) | Outer Layer* | Matrix (Third Compound) |
|---|---|---|---|
| $Al_2O_3$ | WC | Co | WC-12Co |
| Ti(C, N) | WC and/or $W_2C$ | Co | WC-8Co-4TaC |
| $ZrO_2$ | Ti(C, N) and/or WC | Co | WC-10Co-6TiC |
| Diamond | Ti(C, N) | Co | WC-10Co |
| Cubic Boron Nitride | WC and/or Ti(C, N) | Co and/or Ni | WC-6Co |
| $WS_2$ | WC | Co and/or Ni | WC-12Co |
| $TiB_2$ | WC | Co and/or Ni | WC-10Co-6TiC |
| $B_4C$ | WC | Co and/or Ni | WC-6Co |
| ZrN | Ti(C, N) and/or WC | Co | WC-6Co-2TaC |

*optional

Another aspect of the present disclosure relates to methods of making a consolidated material composed of TCHP dispersed in a tough matrix material.

Generally, the methods according to the present disclosure include providing a plurality of TCHP comprising core particles having at least one intermediate layer thereon, mixing the plurality of TCHP with particles of a matrix to form a mixed powder, shaping the mixed powder to form an article, and consolidating the article (e.g., via a process that includes sintering and/or cladding) such that a layer of matrix contains or substantially contains each of said coated particles. Optionally, an outer layer material may be applied to the at least one intermediate layer, e.g., before mixing with the matrix.

The TCHP described herein may be manufactured by any suitable method. For example, the TCHP may be manufactured by providing a plurality of core particles, wherein the core particles are formed from at least one first compound described previously, and providing at least one intermediate layer around a majority of the plurality of core particles, the intermediate layer being formed from at least one second compound described previously.

The at least one intermediate layer may be provided on the core particles by any suitable deposition method. For example, the at least one intermediate layer may be deposited on the core particles via at least one method chosen from chemical vapor deposition, physical vapor deposition, plasma deposition and/or cladding, laser deposition and/or cladding, magnetic plasma deposition, electrochemical deposition, electroless deposition, sputtering, solid phase synthesis, solution chemistry deposition processes, and combinations thereof. For additional non-limiting examples of suitable processes for forming the intermediate layers, reference is made to the processes disclosed in U.S. Pat. No. 6,372,346, and U.S. Pre-Grant Publication No. 2005/0275143, which are incorporated herein by reference.

The particles of matrix material may comprise at least one third compound described previously, or a precursor thereof. For example, the particles of matrix material may include a mixture of first particles and second particles, the first particles comprising at least one of W, WC, and $W_2C$ and the second particles comprising Co. Alternatively, or in addition to the mixture of first and second particles, the matrix may comprise an alloy of at least one of W, WC, $W_2C$ with Co. Similarly, the matrix powder may comprise a precursor material which, upon sintering, cladding and/or other processing, results in a mixture of W, WC, and/or $W_2C$ with a desired amount of Co. In some embodiments, the amount of Co in the matrix ranges from greater than 0 to about 20 weight %.

The TCHP and matrix particles may be mixed using known mixing apparatuses or methods. For example, the TCHP and particles of matrix may be mixed via ball milling, attritor milling, or mechanical stirring. Of course, other mixing methods may be used.

The mixed powder may, for example, contain a uniform (homogenous), substantially uniform, or nonuniform (heterogeneous) distribution of matrix particles and TCHP. In a non limiting embodiment, the mixed powder is composed of a uniform or substantially uniform distribution of TCHP and matrix particles.

Any known method for shaping a particulate material into an article may be used in the methods according to the present disclosure. For example, the mixed powder may be shaped into an article by molding. Further, the mixed powder may be formed into a so-called "green" article by compacting or shaping the blended powder at a temperature lower than the sintering temperature of the powder. For example, an article may be formed by cold pressing (e.g., cold isostatic pressing), wherein sufficient external pressure is applied to the powder to form a "green" article. Alternatively, an article may be preformed by hot pressing (e.g., hot isostatic pressing), wherein external pressure is applied to a powder while the powder is heated to a temperature above, below, or around the sintering temperature. Other non limiting methods of shaping include the mixed powder of the present disclosure include powder injection molding, plastified extrusion, high pressure transmission media, and rapid prototyping.

Fugitive binders may be added to the mixed powder to add green strength to the shaped articles described herein. Non limiting examples of such fugitive binders include paraffin waxes, stearic acid, ethylene bis-stearamide (EBS), plasticizers (e.g., polyvinyl alcohol, polyethylene glycol, and/or synthetic resins), and similar organic compounds. An example of a commercially available fugitive binder is Acrawax. The fugitive binders may be added, for example, in an amount of about 2% by weight. The fugitive binder may be burned off during a later step, such as during a sintering step.

Lubricants may be added to the mixed powder to aid in the formation of a shaped article. For example, where the mixed powder of the present disclosure includes TCHP that are irregularly shaped, lubricants may be added to aid in their compaction and shaping, since the TCHP are not rounded off by dissolution.

In addition, some TCHP particles undergo reactive processes upon contact with oxygen and/or moisture. Thus, a protective coating, such as a polymeric or inert oxide coating, may be applied to the TCHP particles to prevent such processes from occurring.

In some embodiments of the present disclosure, consolidation of the shaped article is performed via a process that includes a thermal treatment process, such as sintering and/or cladding. For example, consolidation of the shaped article may be performed by a process that includes at least one of sinter pressing, liquid phase sintering, vacuum sintering, hot pressing, hot isostatic pressing (HIP), sinter-HIP, furnace sintering, laser cladding, plasma cladding, high velocity oxygen fuel (HVOF) sintering/cladding, spark plasma sintering/cladding, dynamic/explosive compaction, sinter forging, electron beam processing, and electric arc processes (e.g., arc-welding). In some embodiments, the articles described herein are consolidated via a process that applies pressure with a specific directionality, such as uniaxial hot pressing.

In certain embodiments, sintering and/or cladding may occur at conditions, such as temperature and/or consolidating pressure, for a time sufficient to obtain a liquid phase in the at least one intermediate layer, the matrix, or both. The liquid phase may be present an amount ranging from up to 50% of the solid volume of the corresponding material, such as 70% by volume or even 99.5% by volume.

The processing temperatures may range, for example, from 600° C. to about 4000° C., depending on the method used and the materials involved. As used herein, the "processing temperature" is the maximum temperature at which the material to be sintered is exposed. In some embodiments, the transient processing temperature may range from about 600° C. to about 1700° C., such as, for example, from 1250° C. to about 1700° C. In one non limiting embodiment, the transient processing temperature may range from about 1700° C. to about 8000° C.

In some embodiments of the present disclosure, TCHP consolidation takes place at a pressure higher than absolute zero pressure. For example, TCHP consolidation may occur at a pressure ranging from greater than about zero absolute pressure to atmospheric pressure, or higher.

Typically, "vacuum" sintering processes take place in the range of about 1 to less than 250 torr, and is commonly referred to as "pressureless" sintering. In this instance, the use of lower-than-atmospheric pressure is generally for two purposes: control of chemical reaction rates and control of physical processes during the various temperature ranges employed during the sintering process. Furthermore, pressures in excess of 20 MPa are commonly used in pressure densification methods.

Sintering and/or cladding may also occur in the presence of a gas, such as an inert gas. As non limiting examples of such gases, mention is made of nitrogen, argon, helium, neon, krypton, xenon, methane, acetylene, carbon monoxide, carbon dioxide, hydrogen, mixtures thereof, and related compounds.

It should be understood that "pressureless" sintering only refers to sintering or consolidation at sintering temperatures, not the formation of pre-fired or "green" articles, as discussed above. For example, typical compaction processes, such as cold isostatic pressing, apply external pressure to result in a "green" article, but would be understood as not resulting in sintering of the component particles.

Another aspect of the present disclosure relates to articles that are manufactured from the consolidated materials of the present disclosure. As described above, the materials of the present disclosure can exhibit improved fracture toughness relative to traditional sintered TCHP, while substantially maintaining the hardness and/or strength of traditional TCHP. Further, by controlling the processing of the consolidated materials of the present disclosure, it is possible to obtain articles that exhibit isotropic or, alternatively, anisotropic properties.

For example, anisotropic properties have been observed in some embodiments, wherein articles are produced by consolidating the materials of the present disclosure by uniaxial hot pressing. In uniaxial hot pressing, a directional force is introduced to assist in achieving full density of the consolidated material. This introduces a shear component into the stress field which creates a driving force that alters the TCHP particle distribution within the microstructure of this novel material during this type of consolidation.

In some embodiments, mechanical property measurements on "faces" that were perpendicular to this applied force demonstrate higher TRS and consequently have greater strength than those "faces" that were parallel to this force. Although not precisely understood, it is believed that these property differences are the result of processing-related interparticle rearrangements that serve to reinforce strength in one direction, but not the other direction. These rearrangements are believed to result from the directionality of the applied force during uniaxial hot pressing.

That is, it is believed that unlike anisotropy observed in many known systems, the anisotropy observed in some embodiments of the present disclosure does not result from the creation of different metallurgical phases during processing. Rather, and without wishing to be bound by theory, it is believed that the anisotropy results from the creation of interparticle spacing variations introduced by the directionality of the applied force during uniaxial hot pressing. Thus, although uniaxial hot pressing is specifically disclosed herein as being capable of producing a consolidated article having anisotropic properties from the materials of the present disclosure, it is expected that anisotropic properties could be achieved via any consolidation process that applies force with specific directionality.

The ability to introduce anisotropy by controlling the processing of the materials of the present disclosure provides an added degree of freedom to a materials designer seeking a solution for specific application requirements. Further, it is expected that this ability will allow the production of articles with novel property combination via the simultaneous control of composition and processing, and at potentially lower cost than items formed from conventional TCHP.

The consolidated materials according to the present disclosure are suitable for use in any application for which conventional sintered TCHP is suitable. In particular, the materials of the present disclosure have virtually unlimited uses in the manufacture, surface modification, or repair of components, assemblies, and machines. For example, the materials described herein may be used to form cutting, forming, grinding, measuring, shaping, petroleum, mining, and construction tools. Further, the materials according to the present disclosure may be used to form nontool components, such as in biomedical, military, electronic, sports, thermal management, and cosmetic applications. The materials of the present disclosure are also envisioned for broad use in the agricultural, civil, lumber, paper, petrochemical, rubber, plastic, transportation, aircraft/aerospace, maritime, architectural, and energy sectors.

Accordingly, the materials according to the present disclosure are well suited for use in a broad array of articles, including but not limited to:

tooling, such as drawing dies (e.g., wire drawing dies, composite wire dies, enameling wire drawing dies), extrusion dies, forging dies, cutting and stamping dies, forms, forming rollers, injection molds, shears, drills, milling and lathe cutters, saws, hobs, breaches, reamers, taps, and other dies;

individual mechanical parts, such as gears, cams, journals, nozzles, seals, valve seats, pump impellers, capstans, sheaves, bearings, and wear surfaces;

integrated co-sintered components to replace mating parts, internal combustion engine rods, bearings, hard surface zones in powdered metal (P/M) processes, mechanical parts substituted for forged or machined steel parts with heat-treated zones (e.g., camshafts, transmission parts, etc.), and printer/copier parts;

heavy industrial articles such as deep well drilling bits, teeth for mining and earthmoving equipment, and hot rolls for steel mills; and electromechanical components such as memory drive reading heads and specialized magnets.

The consolidated materials of the present disclosure may also be used, for example, to form components of apparatus, machinery, and other articles used in the cleanup and/or amelioration of radioactive (nuclear) material. In one non-limiting embodiment, the consolidated materials described herein are formed into a plate suitable for use in the cleanup and/or amelioration of nuclear material. In this regard, non-limiting mention is made of a consolidated material comprising a plurality TCHP described previously, wherein the TCHP are clad or plated with nickel prior to being mixed with a matrix material.

The disclosure will be more fully illustrated using the following non limiting examples.

EXAMPLES

Example 1

Typical Powder Preparation Procedure

The following is a non limiting example of a powder preparation procedure that was used to prepare a powder in accordance with the present disclosure on a small lab scale basis.

Using a milling container, the proper proportions of TCHP powder and WC—Co matrix powder were weighed. Generally, the total weight of the powders was about 800 g. Thus, to obtain a powder mixture comprising 25 weight % TCHP and 75 weight % matrix, about 200 g of TCHP and about 600 g of WC—Co matrix powder were used. In some instances, the raw material WC—Co matrix powder contained a small amount (~2% by weight) of paraffin wax.

If a waxed powder was desired, an additional 2% of paraffin wax was added to the powder mixture, based on the weight of the TCHP particles. Conversely, if an unwaxed powder was desired, no paraffin wax (beyond the amount present in the raw material powders) was added to the mixture.

WC—Co milling balls in an amount corresponding to a ratio of 1.5 kg milling balls:800 g powder mixture were added to the milling container.

If a waxed powder was being prepared, 150 ml of a suitable solvent (e.g., heptane), was added to the powder/milling balls, and the resulting solution was mixed. Additional solvent was added until the solution had a flowable consistency.

For the preparation of an unwaxed powder, 150 ml of a suitable solvent (e.g., ethanol) was added to the powder/milling balls, and the resulting solution was mixed. Additional solvent was added until the solution had a flowable consistency.

The milling container was than filled with argon gas to minimize air exposure and sealed. The contained was then placed on a rolling mill for a desired time-period, e.g., 2 hours at a desired speed (e.g., 100 RPM) resulting in the formation of a milled solution of TCHP/WC—Co powder.

Example 2

Typical Drying Procedure

The following is a non limiting example of a typical drying procedure for a milled solution of TCHP/WC—Co powder prepared according to Example 1.

A milled solution of TCHP/WC—Co powder was decanted through a large sized sieve into a temperature resistant vessel (e.g., glass). The milling container used to produce the powder was rinsed with the corresponding solvent (e.g., heptane or ethanol) to remove any remaining milled solution from the WC—Co milling balls.

The temperature resistant vessel was then placed in a drying oven at a temperature of about 85° C. under a constant nitrogen flow, e.g., of about 2-3 SCFH. The powder was dried for a desired time, e.g., at least 12 hours.

The powder typically caked together during the drying process. To determine whether the powder was dry, a spatula was used to break apart some of the caked powder. The powder was considered sufficiently dry when the caked powder broke apart into a fine powder.

In the case of a waxed powder, after the powder was dried, it was pressed through a coarse sieve (e.g., one having apertures of about 100μ) to prepare the powder for consolidation.

The dried powders were then stored in argon-filled container (e.g., Nalgene) containers for later use.

Example 3

A First Typical Consolidation Procedure

The following is a non limiting example of a typical procedure used to produce consolidated articles of the present disclosure via uniaxial hot pressing.

A mixed, but unwaxed powder including a mixture of TCHP and WC—Co powder was placed into a graphite die set. The die set containing the mixed powder was loaded into the master die of a hot press. The top ram of the hot press was lowered until it came into contact with the top of the die set. The chamber door of the hot press was then closed, and the chamber was evacuated to a minimum pressure of $5.0 \times 10^{-3}$ torr.

The hot press was programmed to perform a typical heating cycle, and then switched to automatic control. The mixed powder was then pressed at a specified temperature, at a specified ram pressure, for a specified hold time. The standard parameters used were a temperature of about 1400° C., a pressure of 15 MPa, and a hold time of 100 minutes, although other parameters have been tested and successfully used. Generally, the ram pressure was introduced once a temperature of about 1350° C. was obtained, though the pressure may be introduced at other times.

After the heating cycle was complete, the ram pressure was relieved and the press was allowed to "free cool" to room temperature (i.e., no heat is added after this point) with the aid of cooling water. The rate of cooling was primarily determined by cooling water temperature and flow rate.

The master die and graphite die set were then removed from the press, and the graphite die set was removed from the master die. The consolidated TCHP/WC—Co part was removed from the graphite die, and sectioned for property measurements and microstructural evaluation.

Example 4

Comparison of Uniaxial Hot Pressed Traditional $Al_2O_3$ and Ti(C,N) TCHP Articles with Articles in Accordance with the Present Disclosure Two comparative samples, C1 and C2, and seven inventive samples, I1, I2, I3, I4, I5, I6 and I7 were prepared. Comparative sample C1 was formed by hot pressing traditional TCHP particles comprising a core of alumina ($Al_2O_3$) and a shell of tungsten carbide (WC) using the consolidation method described in Example 3. Comparative sample C2 was formed by hot pressing traditional TCHP particles comprising a core of Ti(C,N) and a shell of tungsten carbide (WC) using the consolidation method described in Example 3. Inventive samples I1-I5 were prepared by hot pressing a blend TCHP particles comprising a core of alumina and a shell of tungsten carbide with varying amounts of a WC—Co additive (Matrix) using the processes described in examples 1 and 2. Inventive samples I6 and I7 were prepared by hot pressing a blend of TCHP particles comprising a core of Ti(C,N) and a shell of tungsten carbide with varying amounts of a WC—Co additive (Matrix) using the process described in examples 1 and 2. The milling and drying process for each inventive sample was identical.

WC—Co additive 1 used in examples I1-I3 was a reclaimed grade WC—Co powder comprising 10-12% Co, and was purchased from the ATI Engineered Products (Alldyne) under part no. GWC-12. WC—Co additive 2 used in examples I4 and I5 was a virgin grade WC—Co powder comprising 10-12 weight % Co, and was purchased from Alldyne under part no. GWC-203. WC—Co additive 3 used in examples I6 and I7 was a virgin grade WC—Co powder comprising fine grained WC (0.8 µm) and 10-12 weight % Co, and was purchased from Alldyne under part no. GWC-196.

The comparative and inventive samples were consolidated using a uniaxial hot pressing process in accordance with Example 3. The consolidation process for each sample was identical. After consolidation, the samples were sectioned for property measurements and microstructural analysis. The properties of the raw materials are shown below in Table 2. The composition and properties of the consolidated articles are provided below in Tables 3 and 4. It was observed that the faces of the inventive samples that were perpendicular to the pressing direction exhibited higher (stronger) TRS than those parallel to the pressing direction. The data in Tables 3 and 4 reports the TRS measured in the "strong" direction.

TABLE 2

Composition and Properties of the Raw Materials*

| Material | Hardness (HV) | Transverse Rupture Strength (MPa) |
|---|---|---|
| Alumina TCHP | 1940 | 1050 |
| Ti(C, N) TCHP | 1750 | 1315 |
| WC-Co Additive 1 (reclaimed grade, 10-12% Co) | 1535 | nm |
| WC-Co Additive 2 (Virgin grade, 10-12% Co) | 1651 | nm | nm = not measured
*These measurements were taken on materials formed via the hot-press method of Example 3, with TRS measurements taken in the "strong" direction.

TABLE 3

Composition and Properties of Consolidated Article Samples Comprising TCHP Particles Having a Core of Alumina

| | Alumina | WC-Co | WC-Co | Measured Property | |
|---|---|---|---|---|---|
| Sample | TCHP (wt %) | Additive 1 (wt %) | Additive 2 (wt %) | Hardness (HV) | TRS (MPa) |
| C1* | 100 | — | — | 1940 | 1050 |
| I1 | 75 | 25 | — | nm | nm |
| I2 | 50 | 50 | — | 1923 | 1328 |
| I3 | 25 | 75 | — | 1940 | 1830 |
| I4 | 40 | — | 60 | 2200 | 1425 |
| I5 | 25 | — | 75 | 2162 | 1670 |

*Comparative
nm = not measured

As shown in Table 3, inventive sample I2 exhibited higher TRS than comparative sample C1. In addition, inventive samples I3, I4 and I5 exhibited higher TRS than comparative sample C1, while unexpectedly maintaining the same or better hardness as comparative sample C1.

Figure 2:
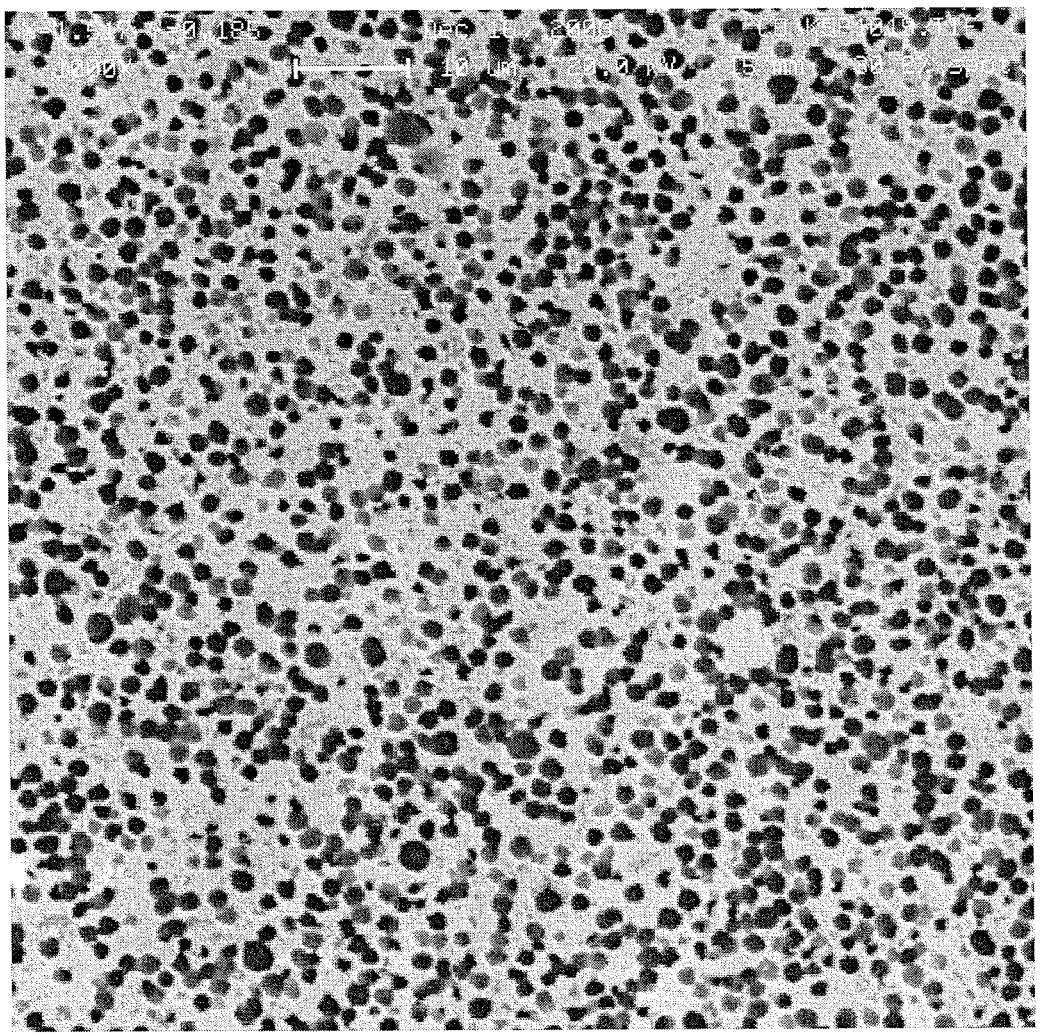
FIG. 2 is a Scanning Electron Microscopy (SEM) photograph of a article produced by consolidating traditional alumina ($Al_2O_3$) TCHP particles via uniaxial hot pressing.
Figure 3:
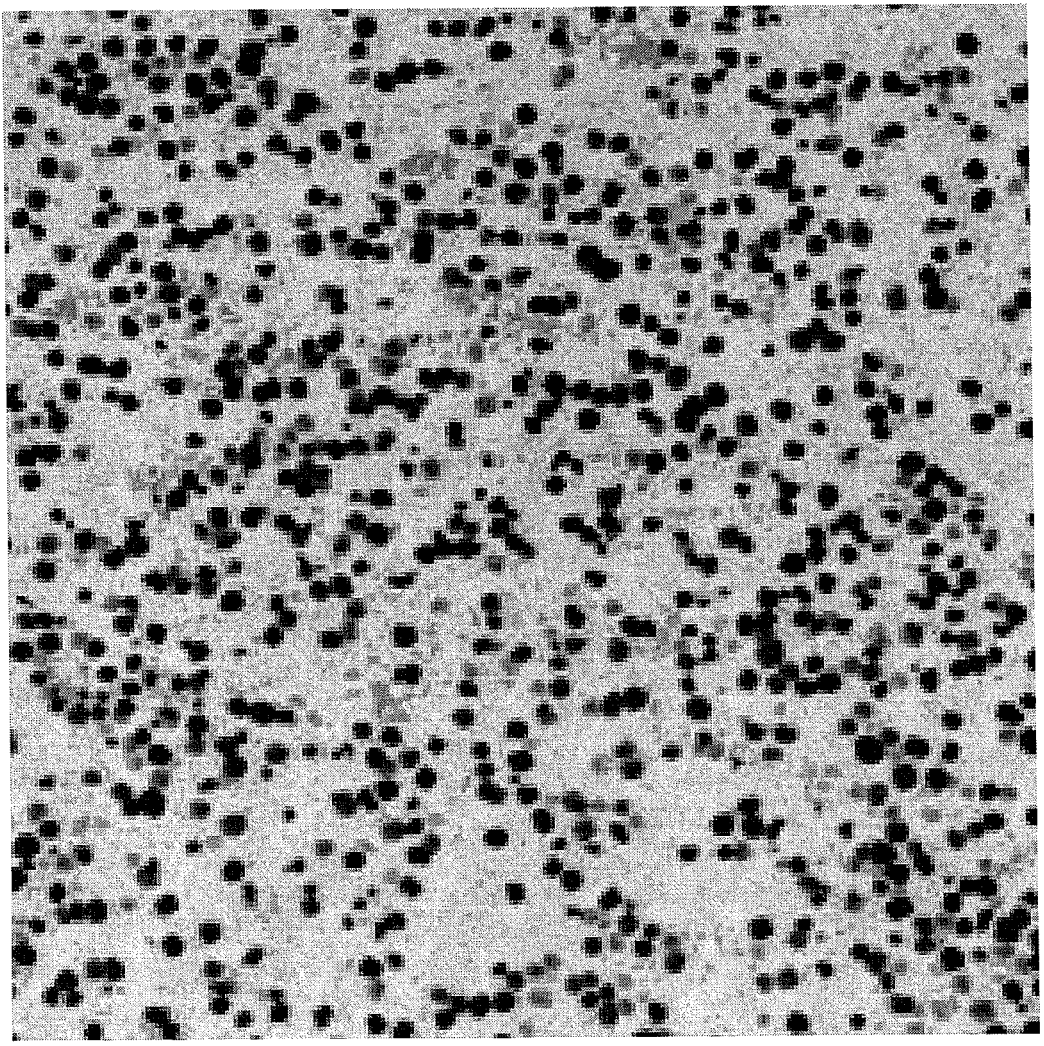
FIG. 3 is a Scanning Electron Microscopy (SEM) photograph of a article produced by consolidating a mixture of 50 weight % alumina ($Al_2O_3$) TCHP particles and 50 weight % reclaimed grade WC—Co particles via uniaxial hot pressing.
Figure 4:
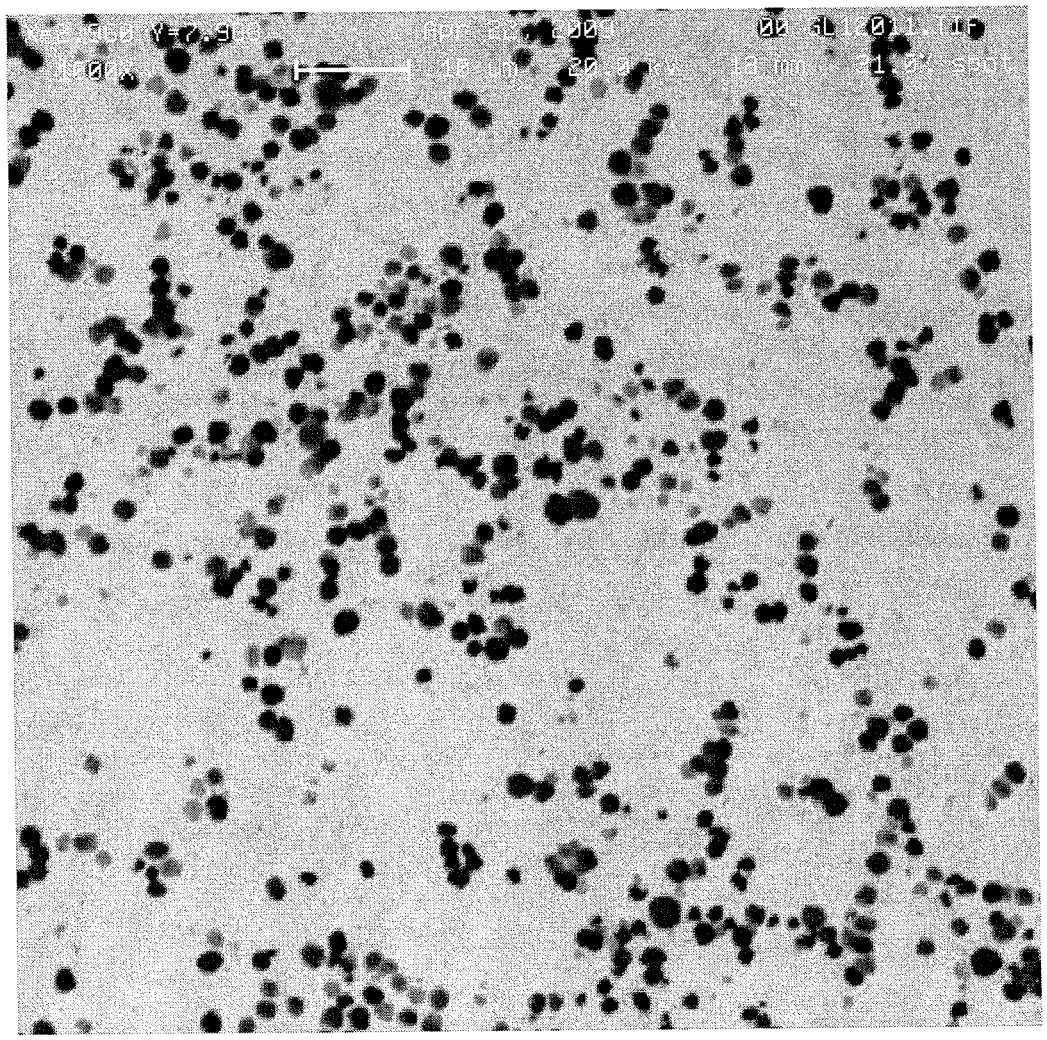
FIG. 4 is a Scanning Electron Microscopy (SEM) photograph of a article produced by consolidating a mixture of 25 weight % alumina ($Al_2O_3$) TCHP particles and 75 weight % reclaimed grade WC—Co particles via uniaxial hot pressing.

The microstructure of each sample was analyzed with scanning electron microscopy. The microstructure of comparative sample C1, inventive sample I2, and inventive sample I3 are shown in FIGS. 2, 3, and 4 respectively. As shown, the interparticle distance in the comparative sample was less than the interparticle distance in either inventive example. Further, the interparticle distance of sample I3 (FIG. 4) was greater than that of sample I2 (FIG. 3), which is attributable to the increased amount of WC—Co matrix in sample I1, relative to sample I2.

Figure 5:
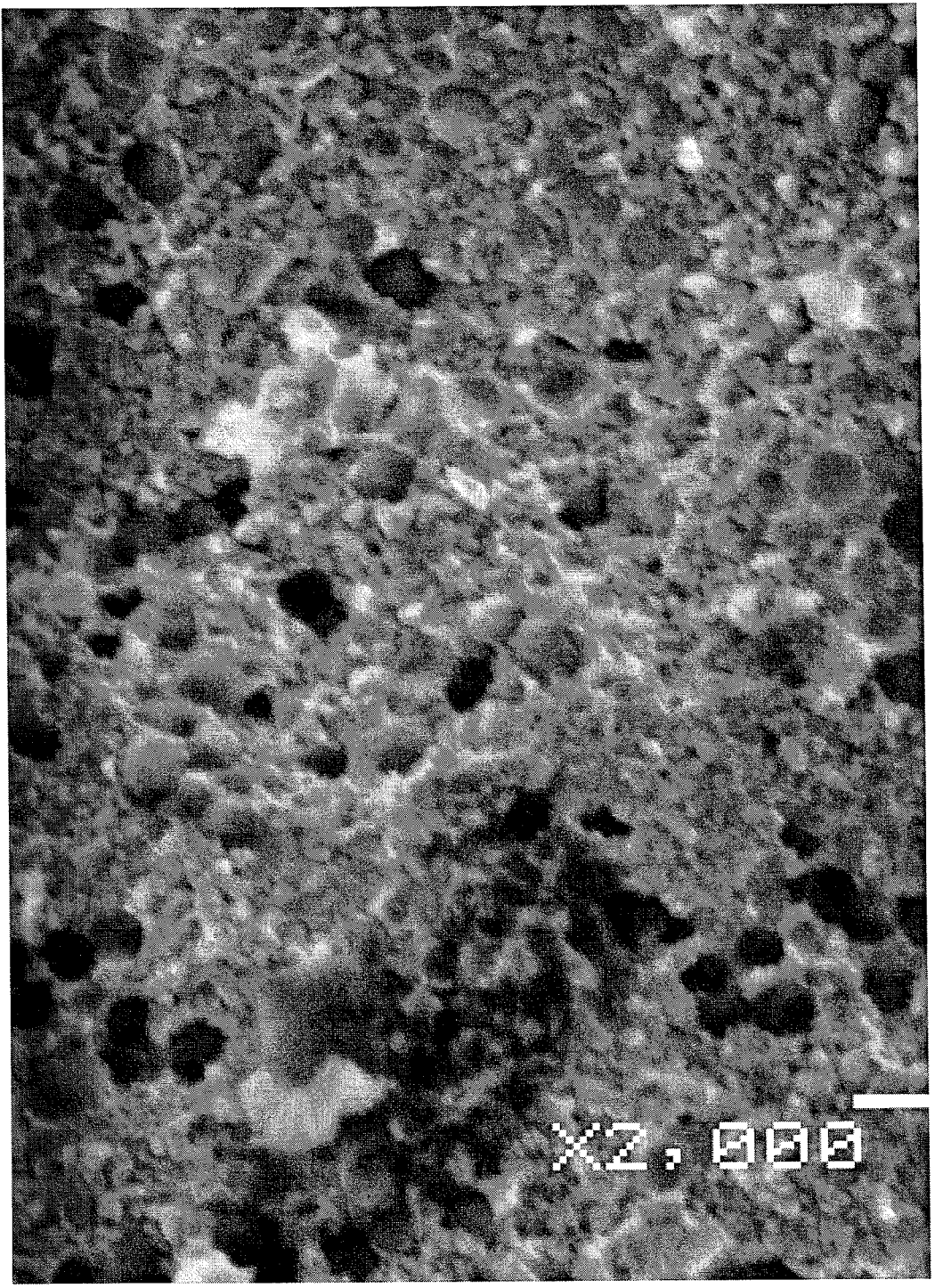
FIG. 5 is a high magnification Scanning Electron Microscopy (SEM) photograph illustrating the fracture surface of an article produced by consolidating a mixture of 25 weight % alumina ($Al_2O_3$) TCHP particles and 75 weight % reclaimed grade WC—Co particles via uniaxial hot pressing.
Figure 6:
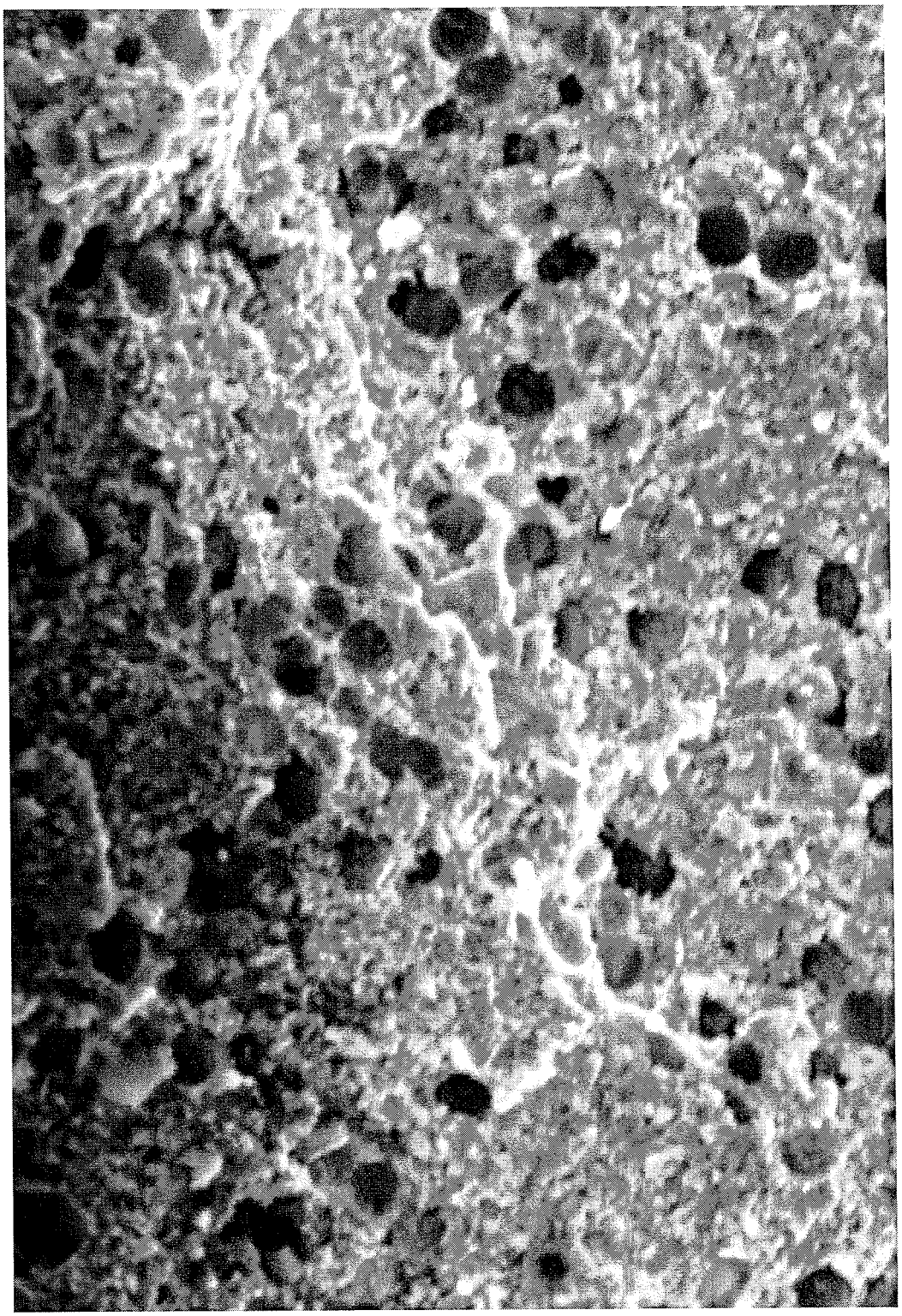
FIG. 6 is a high magnification Scanning Electron Microscopy (SEM) photograph illustrating the fracture surface of an article produced by consolidating a mixture of 25 weight % alumina ($Al_2O_3$) TCHP particles and 75 weight % virgin grade WC—Co particles via uniaxial hot pressing.
Figure 7:
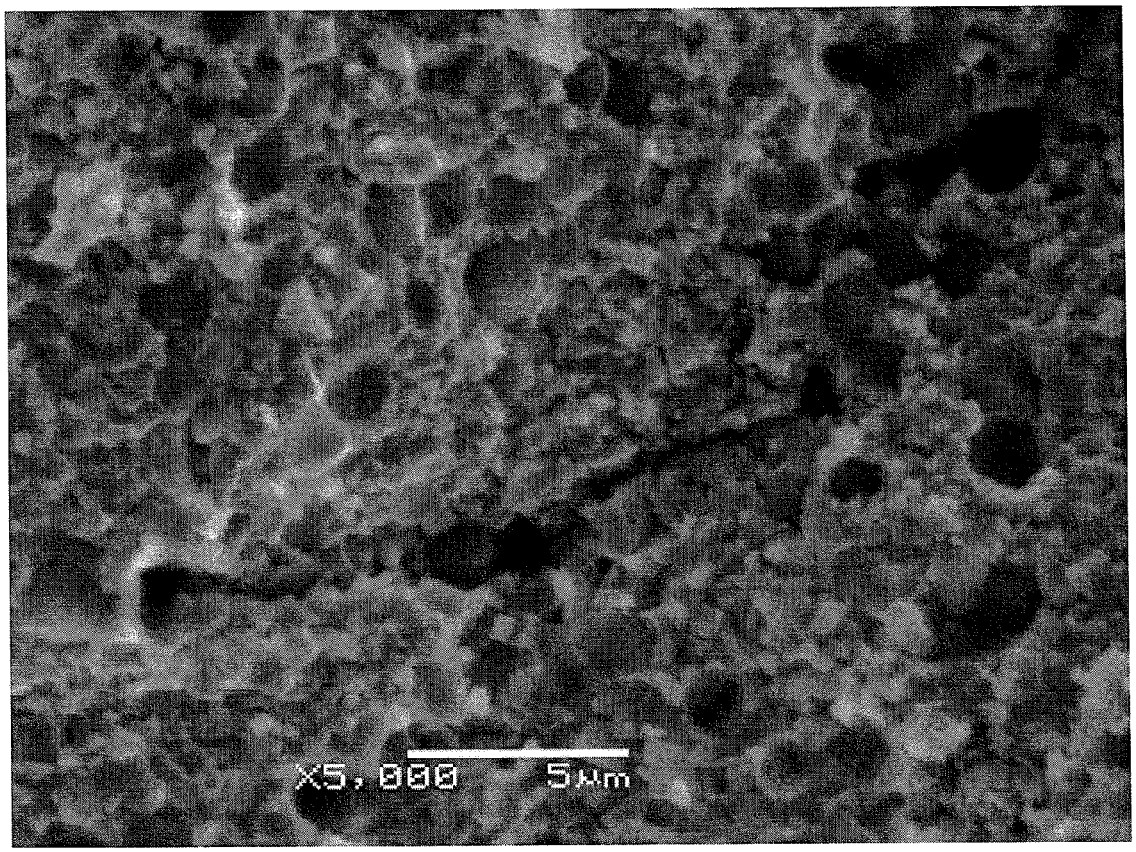
FIG. 7 is a high magnification Scanning Electron Microscopy (SEM) photograph illustrating the crack deflection through and around TCHP particles in the fracture surface of an article produced by consolidating a mixture of 25 weight % alumina ($Al_2O_3$) TCHP particles and 75 weight % reclaimed grade WC—Co particles via uniaxial hot pressing.

High magnification scanning electron micrographs of the fracture surface microstructure of samples I3 and I5 are shown in FIGS. 5 through 8. FIGS. 5 and 7 correspond to sample I3, and FIGS. 6 and 8 correspond to sample I5.

As shown in FIGS. 5 and 6, sample I3 showed less fractured $Al_2O_3$ particles than sample I5. Further, both samples showed evidence of several $Al_2O_3$ particles being pulled out of the matrix. The analysis also showed evidence that the microstructure of each sample may react differently to an induced structural fault, namely a crack.

Figure 8:
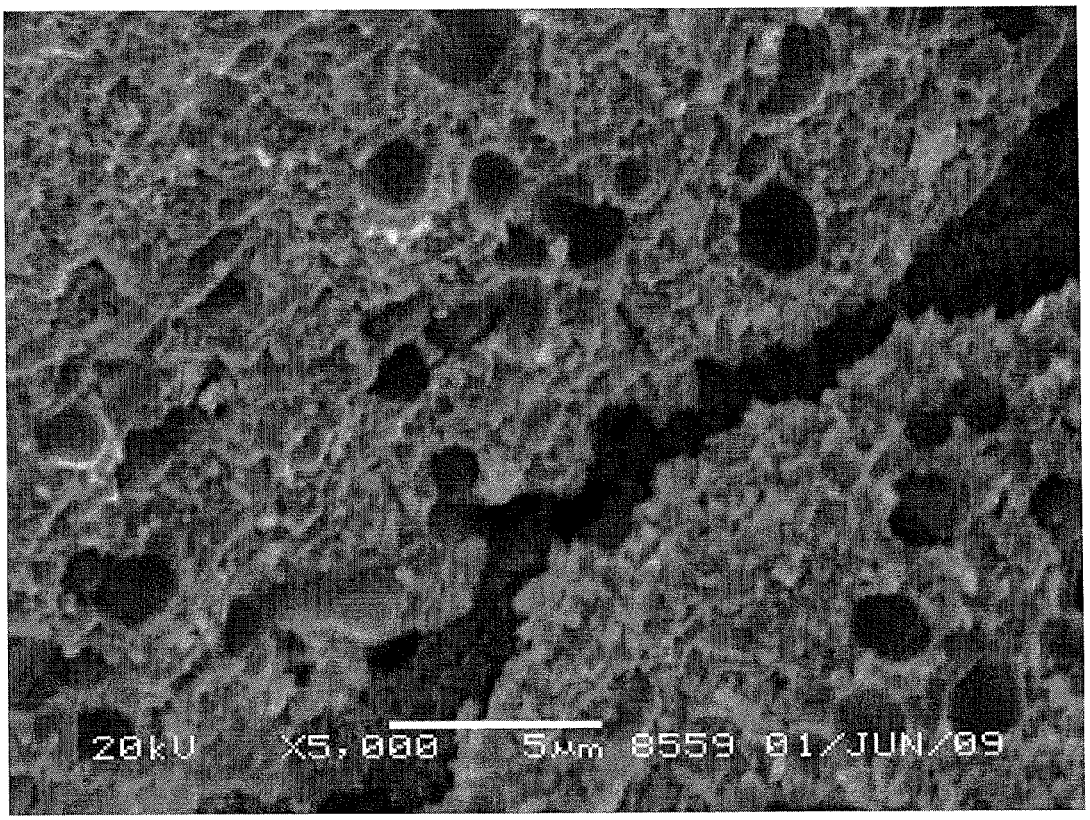
FIG. 8 is a high magnification Scanning Electron Microscopy (SEM) photograph illustrating the crack deflection through and around TCHP particles in the fracture surface of an article produced by consolidating a mixture of 25 weight % alumina ($Al_2O_3$) TCHP particles and 75 weight % virgin grade WC—Co particles via uniaxial hot pressing.

As shown in FIG. 7, the fracture surface of a crack in sample I3 was redirected completely around an $Al_2O_3$ particle. In contrast, FIG. 8 shows that in sample I5, a similar fracture surface proceeds through an $Al_2O_3$ particle, although another crack region was found in sample I5 with a fracture surface proceeding around an $Al_2O_3$ particle. Thus, it appeared that the tendency to redirect cracks around core particles was more pronounced in sample I3 than in sample I5. It is believed that this difference may be due to the chemistry or properties of the reclaimed grade WC—Co additive used in sample I3, relative to the virgin grade WC—Co additive used in sample I5.

TABLE 4

Composition and Properties of Consolidated Article Samples Comprising TCHP Particles Having a Core of Ti(C, N)

| Sample | Ti(C, N) TCHP (wt %) | WC-Co Additive 3 (wt %) | Measured Property | |
|---|---|---|---|---|
| | | | Hardness (HV) | TRS (MPa) |
| C2* | 100 | — | 1750 | 1315 |
| I6 | 33 | 66 | 1975 | 1525 |
| I7 | 25 | 75 | 2175 | 1775 |

*Comparative

As shown in Table 4, inventive samples I6 and I7 exhibited higher TRS than C2, while unexpectedly exhibiting better hardness than comparative sample C2.

Example 5

A Second Typical Consolidation Procedure

The following is a non limiting example of a typical procedure used to produce consolidated articles of the present disclosure via vacuum sintering.

A mixed waxed powder including a mixture of TCHP, WC—Co powder, was placed into a die cavity of a mechanical press. The powder was compressed axially to form various pressed parts. These pressed parts were then placed into a furnace, and the furnace sealed. The pressure in the furnace was reduced to 200 mTorr. The temperature in the furnace was then raised to 440° C. and held for 4 hours. The temperature in the furnace was then raised to 1250° C. and held for an additional 45 minutes. The temperature in the furnace was then raised to the sintering temperature, for example, 1440° C., and held for 60 minutes.

After the heating cycle was complete, the furnace was allowed to cool. The consolidated parts were removed from the furnace, and then were sectioned for property measurements.

Example 6

Vacuum Sintered Articles in Accordance with the Present Disclosure

Eight samples according to the present disclosure, Samples 8-15, were prepared by vacuum sintering. Samples 8-15 were prepared by vacuum sintering a blend of TCHP particles comprising a core of Ti(C,N) and a shell of tungsten carbide with varying amounts of a WC—Co additive (Matrix) using the processes described in examples 1 and 2. The milling and drying process for each sample was identical.

WC—Co additive 3 used in Samples 8-11 was the same as previously described, e.g., a virgin grade WC—Co powder comprising fine grained WC (0.8 μm) and 10-12 weight % Co, and was purchased from Alldyne under part no. GWC-196. WC—Co additive 4 used in Samples 12-15 was a virgin grade WC—Co powder comprising fine grained WC (3 μm) and 10-12 weight % Co, and was purchased from Alldyne under part no. GWC-15.

The samples were consolidated using a vacuum sintering process in accordance with example 5. The consolidation process for each sample was identical. After consolidation, the samples were sectioned for property measurements. The properties of the consolidated materials are shown below in Table 5. The composition and properties of the consolidated articles are provided below in Table 6.

TABLE 5

Composition and Properties of the Consolidated Raw Materials

| Material | Hardness (HV) | Transverse Rupture Strength (MPa) |
|---|---|---|
| Ti(C, N) TCHP | 1750* | 1315* |
| WC-Co Additive 3 (Virgin grade, fine grained WC (0.8 μm), 10-12% Co) | 1825** | 1382** |
| WC-Co Additive 4 (Virgin grade, medium grained WC (3 μm), 10-12% Co) | 1450** | 1562** |

*Measurement made on a material that was consolidated via the hot-press method described in Example 3, with TRS measured in the "strong" direction.
**Measurements made on a vacuum-sintered material prepared in accordance with Example 5.

TABLE 6

Composition and Properties of Consolidated Article Samples Comprising TCHP Particles Having a Core of Ti(C, N)

| Sample | Ti(C, N) TCHP (wt %) | WC-Co Additive 3 (wt %) | WC-Co Additive 4 (wt %) | Measured Property | |
|---|---|---|---|---|---|
| | | | | Hardness (HV) | TRS (MPa) |
| 8 | 80 | 20 | — | 1625 | 1150 |
| 9 | 60 | 40 | — | 1750 | 1107 |
| 10 | 40 | 60 | — | 1825 | 1156 |
| 11 | 20 | 80 | — | 1875 | 1291 |
| 12 | 80 | — | 20 | 1100 | 1089 |
| 13 | 60 | — | 40 | 1200 | 1149 |
| 14 | 40 | — | 60 | 1425 | 1476 |
| 15 | 20 | — | 80 | 1550 | 1489 |

As shown in Table 6, the TRS and hardness properties of the vacuum sintered compositions prepared in accordance with the disclosure can be tailored for particular applications.

It will be appreciated by those skilled in the art that changes could be made to the embodiments described above without departing from the broad inventive concept thereof. It is understood, therefore, that the present disclosure is not limited to the particular embodiments disclosed, but is intended to cover modifications which are within the spirit and scope of the invention, as defined by the appended claims.

Unless otherwise indicated, all numbers expressing quantities of ingredients, reaction conditions, and so forth used in the specification and claims are to be understood as being modified in all instances by the term "about," which is intended to mean +/−5% of the number expressed. Accordingly, unless indicated to the contrary, the numerical parameters set forth in the specification and the attached claims are approximations that may vary depending upon the desired properties sought to be obtained by the present disclosure.

What is claimed is:

1. A consolidated material, comprising:
   coated particles in a matrix, said coated particles comprising a core material, and
   at least one intermediate layer on said core material;
   wherein said at least one intermediate layer comprises a material different from said core material and said intermediate layer has a fracture toughness higher than said core material, wherein said coated particles have an average diameter less than 50 microns and the intermediate layer has a thickness, after sintering, of 5% of the diameter of the core particle, wherein said matrix comprises a mixture of first particles comprising W or WC with second particles comprising Co, and/or said matrix comprises an alloy of Co with W and/or WC, Co being present in said matrix in an amount ranging from greater than 0 to about 20 weight %, and wherein an interparticle distance between adjacent coated particles in said matrix ranges from 2 to 20 times a base interparticle distance, wherein said base interparticle distance is the distance between central portions of adjacent coated particles in the absence of said matrix.

2. The consolidated material of claim 1, wherein said core material comprises at least one of diamond, cubic boron nitride, and at least one first compound, said at least one first compound comprising at least one primary element compounded with at least one secondary element, wherein said at least one primary element is chosen from titanium, zirconium, hafnium, vanadium, niobium, tantalum, chromium, molybdenum, tungsten, aluminum, magnesium, and silicon, and said at least one secondary element is chosen from nitrogen, carbon, boron, sulfur and oxygen.

3. The consolidated material of claim 1, wherein said core material consists essentially of at least one of $AlB_2$, $Al_4C_3$, $AlN$, $Al_2O_3$, $AlMgB_{14}$, $B_4C$, cubic boron nitride (cBN), hexagonal boron nitride (hBN), $CrB_2$, $Cr_3C_2$, $Cr_2O_3$, diamond, $HfB_2$, $HfC$, $HfN$, $Hf(C,N)$, $MoB_2$, $Mo_2B_5$, $Mo_2C$, $MoS_2$, $MoSi_2$, $NbB_2$, $NbC$, $NbN$, $Nb(C,N)$, $SiB_4$, $SiB_6$, $SiC$, $Si_3N_4$, $SiAlCB$, $TaB_2$, $TaC$, $TaN$, $Ta(C,N)$, $TiB_2$, $TiC$, $TiN$, $Ti(C,N)$, $VB_2$, $VC$, $VN$, $V(C,N)$, $WB$, $WB_2$, $W_2B_5$, $WC$, $W_2C$, $WS_2$, $ZrB_2$, $ZrC$, $ZrN$, $Zr(C,N)$, $ZrO_2$, and mixtures and alloys thereof.

4. The consolidated material of claim 1, wherein said at least one intermediate layer on said core material comprises at least one of W, WC, $W_2C$, $Ti(C,N)$, TiC, TiN, optionally alloyed or compounded with cobalt.

5. The consolidated material of claim 4, wherein said matrix comprises more cobalt than said at least one intermediate layer.

6. The consolidated material of claim 1, wherein said coated particles have an average particle size less than about 2 μm.

7. The consolidated material of claim 1, wherein said matrix further comprises at least one additive chosen from carbides of vanadium, niobium, tantalum, titanium, chromium and mixtures thereof.

8. The consolidated material of claim 1, wherein said coated particles are present in said matrix in an amount ranging from greater than 0 to about 50 weight %.

9. The consolidated material of claim 1, wherein
said core material comprises at least one of diamond, cubic boron nitride, and/or at least one first compound, said at least one first compound comprising at least one primary element compounded with at least one secondary element, wherein said at least one primary element is chosen from titanium, zirconium, hafnium, vanadium, niobium, tantalum, chromium, molybdenum, tungsten, aluminum, magnesium, and silicon, and said at least one secondary element is chosen from nitrogen, carbon, boron, sulfur and oxygen; and
said at least one intermediate layer on said core material comprises at least one of W, WC, $W_2C$ and $Ti(C,N)$.

10. The consolidated material of claim 1, wherein said core material further comprises an outer layer located over said intermediate layer, said outer layer comprising Co, Ni or combinations thereof.

11. A sintered material, comprising:
coated particles in a matrix, wherein said coated particles comprise:
a plurality of core particles comprising a core material consisting essentially of at least one first compound chosen from cubic boron nitride and diamond; and
at least one intermediate layer around substantially each of said plurality of core particles, said at least one intermediate layer consisting essentially of at least one second compound different in composition from said first compound, said second compound having a fracture toughness higher than said first compound;
wherein said matrix surrounds or substantially surrounds each or substantially each of said coated particles, said matrix comprising at least one third compound comprising a mixture of first particles comprising tungsten and/or tungsten carbide with second particles comprising cobalt, and/or said at least one third compound comprises particles of an alloy of tungsten and/or tungsten carbide with cobalt, cobalt being present in said third compound in an amount ranging from greater than 0 to about 20 weight %
wherein said coated particles have an average diameter less than 50 microns and the intermediate layer has a thickness, after sintering, of 5% of the diameter of the core particle, and
wherein an interparticle distance between adjacent coated particles in said matrix ranges from 2 to 20 times a base interparticle distance, wherein said base interparticle distance is the distance between central portions of adjacent coated particles in the absence of said matrix.

12. The sintered material of claim 11, wherein said at least one second compound comprises tungsten carbide and cobalt.

13. The sintered material of claim 11, wherein said core material further comprises an outer layer located over said intermediate layer, said outer layer comprising Co, Ni or combinations thereof.

14. A method of providing a consolidated article, comprising:
providing a plurality of core particles comprising a core material having a Diameter less than 50 microns;
providing at least one intermediate layer on substantially each of said plurality of core particles to form coated particles having an average particle size less than 50 microns, wherein the intermediate layer has a thickness, after sintering, of 5% of the diameter of the core paricle,
wherein said at least one intermediate layer comprises a material different from said core material and has a fracture toughness higher than said core material;
mixing said coated particles with a powder of a matrix material to form a mixed powder, wherein said matrix material comprises a mixture of first particles comprising tungsten and/or tungsten carbide with second particles comprising cobalt, and/or said matrix comprises particles of an alloy of tungsten and/or tungsten carbide with cobalt, cobalt being present in said matrix material in an amount ranging from greater than 0 to about 20 weight %;
shaping said mixed powder into an article; and
consolidating said article such that said layer of matrix contains or substantially contains each of said coated particles, wherein an interparticle distance between adjacent coated particles in said matrix ranges from 2 to 20 times a base interparticle distance, wherein said base interparticle distance is the distance between central portions of adjacent coated particles in the absence of said matrix.

15. The method of claim 14, wherein said core material comprises at least one of diamond, cubic boron nitride, and at least one first compound, said at least one first compound comprising at least one primary element compounded with at least one secondary element, wherein said at least one primary element is chosen from titanium, zirconium, hafnium, vanadium, niobium, tantalum, chromium, molybdenum, tungsten, aluminum, magnesium, and silicon, and said at least one secondary element is chosen from nitrogen, carbon, boron, sulfur and oxygen.

16. The method of claim 15, wherein said core material consists essentially of at least one of $AlB_2$, $Al_4C_3$, $AlN$, $Al_2O_3$, $AlMgB_{14}$, $B_4C$, cubic boron nitride (cBN), hexagonal boron nitride (hBN), $CrB_2$, $Cr_3C_2$, $Cr_2O_3$, diamond, $HfB_2$, HfC, HfN, Hf(C,N), $MoB_2$, $Mo_2B_5$, $Mo_2C$, $MoS_2$, $MoSi_2$, $NbB_2$, NbC, NbN, Nb(C,N), $SiB_4$, $SiB_6$, SiC, $Si_3N_4$, SiAlCB, $TaB_2$, TaC, TaN, Ta(C,N), $TiB_2$, TiC, TiN, Ti(C,N), $VB_2$, VC, VN, V(C,N), WB, $WB_2$, $W_2B_5$, WC, $W_2C$, $WS_2$, $ZrB_2$, ZrC, ZrN, Zr(C,N), $ZrO_2$, and mixtures and alloys thereof.

17. The method of claim 14, wherein said at least one intermediate layer on said core material comprises W, WC, $W_2C$, Ti(C, N), TiC, TiN, optionally alloyed or compounded with cobalt.

18. The method of claim 17, wherein said matrix material comprises more cobalt than said at least one intermediate layer.

19. The method of claim 14, wherein said coated particles have an average particle size less than about 2 μm.

20. The method of claim 14, wherein said coated particles are present in said matrix in an amount ranging from greater than 0 to about 50 weight %.

21. The method of claim 14, wherein said at least one intermediate layer is provided by at least one method selected from chemical vapor deposition, physical vapor deposition, plasma deposition, laser cladding or deposition process, plasma cladding, magnetic plasma deposition, electrochemical deposition, electroless deposition, sputtering, solid phase synthesis, or solution chemistry deposition process.

22. The method of claim 14, wherein said step of consolidating said article comprises sintering and/or cladding that is performed by at least one process chosen from sinter pressing, liquid phase sintering, vacuum sintering, powder injection molding, plastified extrusion, hot pressing, hot isostatic pressing (HIP), sinter-HIP, furnace sintering, laser cladding, plasma cladding, high velocity oxygen fuel (HVOF) sintering, spark plasma sintering, pressure-transmission media, dynamic/explosive compaction, sinter forging, rapid prototyping, electron beam processing, and electric arc processes.

23. A drawing die comprising a consolidated material, the consolidated material comprising:
    coated particles in a matrix, said coated particles comprising a core material, and
    at least one intermediate layer on said core material, wherein said at least one intermediate layer comprises a material different from said core material and has a fracture toughness higher than said core material,
    wherein said core material consists essentially of diamond, cubic boron nitride, $Al_2O_3$, $B_4C$, $TiB_2$, TiC, TiN, Ti(C, N), $WS_2$, ZrN, and $ZrO_2$ and mixtures and alloys thereof;
    wherein said at least one intermediate layer on said core material comprises at least one of W, WC, $W_2C$, Ti(C, N), TiC, and TiN, optionally alloyed or compounded with cobalt;
    wherein said coated particles have an average particle size less than 50 microns and the intermediate layer has a thickness, after sintering, of 5% of the diameter of the core particle,
    wherein said matrix comprises a mixture of first particles comprising W or WC with second particles comprising Co, and/or said matrix comprises an alloy of Co with W and/or WC, Co being present in said matrix in an amount ranging from greater than 0 to about 20 weight %; and
    wherein an interparticle distance between adjacent coated particles in said matrix ranges from 2 to 20 times a base interparticle distance, wherein said base interparticle distance is the distance between central portions of adjacent coated particles in the absence of said matrix.

* * * * *